United States Patent
Lee et al.

(10) Patent No.: US 8,653,951 B2
(45) Date of Patent: Feb. 18, 2014

(54) METHOD, SYSTEM AND DEVICES FOR REMOTE CONTROL AND BE-CONTROLLED

(75) Inventors: Kuen-Ming Lee, Tainan (TW); Chi-Wei Huang, Yongkang (TW); Yu-Chang Chao, Zhongpu Township, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 301 days.

(21) Appl. No.: 13/034,793

(22) Filed: Feb. 25, 2011

(65) Prior Publication Data

US 2012/0127011 A1   May 24, 2012

(30) Foreign Application Priority Data

Nov. 24, 2010   (TW) .............................. 99140658 A

(51) Int. Cl.
*G08C 19/16*   (2006.01)
*G05B 11/01*   (2006.01)
(52) U.S. Cl.
USPC ................... 340/12.28; 340/12.29; 340/5.61; 340/12.1; 348/731; 348/734; 455/151.1; 455/352; 345/107; 345/156; 345/172; 341/173; 341/176
(58) Field of Classification Search
USPC ............ 340/5.61–5.65, 12.1–12.29; 341/173, 341/176; 348/731–734; 345/107, 156, 169, 345/172; 455/151.1, 352
See application file for complete search history.

(56) References Cited

U.S. PATENT DOCUMENTS

| | | |
|---|---|---|
| 4,728,949 A | 3/1988 | Platte et al. |
| 5,625,608 A | 4/1997 | Grewe et al. |
| 5,959,539 A | 9/1999 | Adolph et al. |
| 6,097,309 A | 8/2000 | Hayes et al. |
| 6,225,938 B1 | 5/2001 | Hayes et al. |
| 6,437,836 B1 | 8/2002 | Huang et al. |
| 6,522,283 B1 | 2/2003 | Shiga et al. |
| 6,748,278 B1 | 6/2004 | Maymudes |
| 7,146,129 B2 | 12/2006 | Bostrom et al. |
| 7,319,394 B2 * | 1/2008 | Sheller ...................... 340/572.1 |

(Continued)

FOREIGN PATENT DOCUMENTS

| | | |
|---|---|---|
| CN | 101681195 A | 3/2010 |
| TW | 201038018 A | 10/2010 |

OTHER PUBLICATIONS

TW Office Action dated Aug. 26, 2013.

*Primary Examiner* — George Bugg
*Assistant Examiner* — Sharmin Akhter
(74) *Attorney, Agent, or Firm* — McClure, Qualey & Rodack, LLP

(57) ABSTRACT

A remote control method applied to a remote control system, including a remote control device and at least one be-controlled device, includes the following steps. The remote control device discovers the at least one be-controlled device dynamically via a network and retrieves a device control profile from the at least one be-controlled device. The device control profile includes a composite finite state machine representing the dependency of various operation states of the at least one be-controlled device and multiple control codes coded in a bit-string format. Then the remote control device retrieves a current operation state code from the at least one be-controlled device via the network periodically. The remote control device analyzes the current operation state code based on the device control profile to accordingly generate a user interface to control the at least one be-controlled device.

18 Claims, 7 Drawing Sheets

(56) References Cited

U.S. PATENT DOCUMENTS

| | | |
|---|---|---|
| 7,330,174 B2 | 2/2008 | du Breuil |
| 7,339,514 B2 | 3/2008 | Knespel et al. |
| 7,769,910 B2 | 8/2010 | Krzyzanowski |
| 2008/0313548 A1 | 12/2008 | Krzyzanowski |
| 2011/0018692 A1* | 1/2011 | Smith et al. .................. 340/10.4 |
| 2011/0074545 A1* | 3/2011 | Yamada et al. ................ 340/6.1 |
| 2011/0095873 A1* | 4/2011 | Pratt et al. .................. 340/12.28 |

* cited by examiner

METHOD, SYSTEM AND DEVICES FOR REMOTE CONTROL AND BE-CONTROLLED

This application claims the benefit of Taiwan application Serial No. 99140658, filed Nov. 24, 2010, the subject matter of which is incorporated herein by reference.

BACKGROUND

1. Technical Field

The disclosure relates in general to a method, a system and devices for remote control and be-controlled.

2. Background

In modern smart home life, electronic appliances cooperating with remote controllers are common basic equipments. To solve the problem of multiple appliances needing multiple remote controllers, a universal remote controller is invented to replace the remote controllers of origin to achieve a purpose of controlling multiple appliances with only single remote controller. The universal remote controller mainly stores control signals of multiple appliances in previous, and needs to configure corresponding control signals set for the objective appliance by signal-scanning.

Due to meet the need of usability of diversity appliances, a control interface of the universal remote controller is filled with numerous function buttons. Only part of the function buttons are working and others are not when controlling one device. For example, function buttons for a video recorder do not work when the user use the universal remote controller to control a television; function buttons for setting temperature and wind-quantity do not work when an air conditioner is at a dehumifying dryer mode. Therefore, the numerous function buttons on the control interface of the universal remote controller usually mislead the user to perform error operations. In additions, the control interface of the universal remote controller is more and more complicated as the electronic appliances are developed fast and complicatedly nowadays, thus resulting in uncomfortable usage experience.

On the other hand, an idea of remote controlling the electronic appliances via a network is proposed. It not only solves the line of sight limitation of a traditional infrared rays remote controller, but also further replaces a traditional wireless radio frequency coding technique with control modes of commands and file formats (such as XML files). However, the design of the remote controller still tends to display all function buttons on the control interface, such that there is no mechanism to provide users simpler and more intuitive control modes in the user interface.

In addition, the network appliances have to provide many network services for control point to control in applying universal plug and play (UPnP) and web service standards. And the remote control device also has to have powerful service analyzing abilities to dynamically discover an appliance and control it. However, more complicated control formats and powerful control functions usually cause the loads of the network transmission and the bottleneck of machine communication.

SUMMARY

The disclosure is directed to a remote control method, a remote control system, a remote control device and a be-controlled device, capable of utilizing a composite finite state machine to represent the dependency of the be-controlled device's various operation states and providing a simple and intuitive usage experience to users.

According to a first aspect of the present disclosure, a remote control method applied to a remote control system is provided. The remote control system includes a remote control device and at least one be-controlled device. The remote control method includes the following steps. The remote control device discovers the at least one be-controlled device dynamically via a network and retrieves a device control profile from the at least one be-controlled device. The device control profile includes a composite finite state machine representing the dependency of various operation states of the at least one be-controlled device and multiple control codes coded in a bit-string format. Then the remote control device retrieves a current operation state code of the at least one be-controlled device via the network periodically. The remote control device analyzes the current operation state code based on the device control profile to accordingly generate a user interface to control the at least one be-controlled device.

According to a second aspect of the present disclosure, a remote control system is provided. The remote control system includes at least one be-controlled device and a remote control device. The remote control device discovers the at least one be-controlled device dynamically via a network and retrieves a device control profile from the at least one be-controlled device. The device control profile includes a composite finite state machine representing the dependency of various operation states of the at least one be-controlled device and multiple control codes coded in a bit-string format. Then the remote control device retrieves a current operation state code of the at least one be-controlled device via the network periodically. The remote control device analyzes the current operation state code based on the device control profile and accordingly generates a user interface to control the at least one be-controlled device.

According to a third aspect of the present disclosure, a remote control device is provided. The remote control device includes a network communication interface, a device discovery module, a device management module and a user interface generation module. The network communication interface communicates with a network. The device discovery module discovers at least one be-controlled device via the network and establishes communication with the at least one be-controlled device. Then the device management module retrieves a device control profile and a current operation state code from the at least one be-controlled device via the network. The device control profile includes a composite finite state machine representing the dependency of various operation states of the at least one be-controlled device and multiple control codes coded in a bit-string format. The device management module further transmits the control codes to the at least one be-controlled device to control it. The user interface generation module analyzes the current operation state code based on the device control profile and accordingly generates or refreshes a user interface dynamically to control the at least one be-controlled device.

According to a fourth aspect of the present disclosure, a be-controlled device is provided. The be-controlled device includes a network communication interface, a device broadcast module and a device management agent module. The network communication interface communicates with a network. The device broadcast module automatically broadcasts device information to the network to be discovered by a remote control device for communication. The device management agent module provides a device control profile and a current operation state code when the remote control device requested via the network. The device control profile includes a composite finite state machine representing the dependency of various operation states of the be-controlled device and multiple control codes coded in a bit-string format.

The disclosure will become apparent from the following detailed description of the preferred but non-limiting embodiments. The following description is made with reference to the accompanying drawings.

DETAILED DESCRIPTION OF THE DISCLOSURE

The disclosure proposes a method, a system, a remote control device and a be-controlled device that use device control profiles to control devices to provide simple and intuitive usage experience to users. The device control profile includes a composite finite state machine representing the dependency of various operation states of the at least one be-controlled device and multiple control codes coded in a bit-string format.

Figure 1:
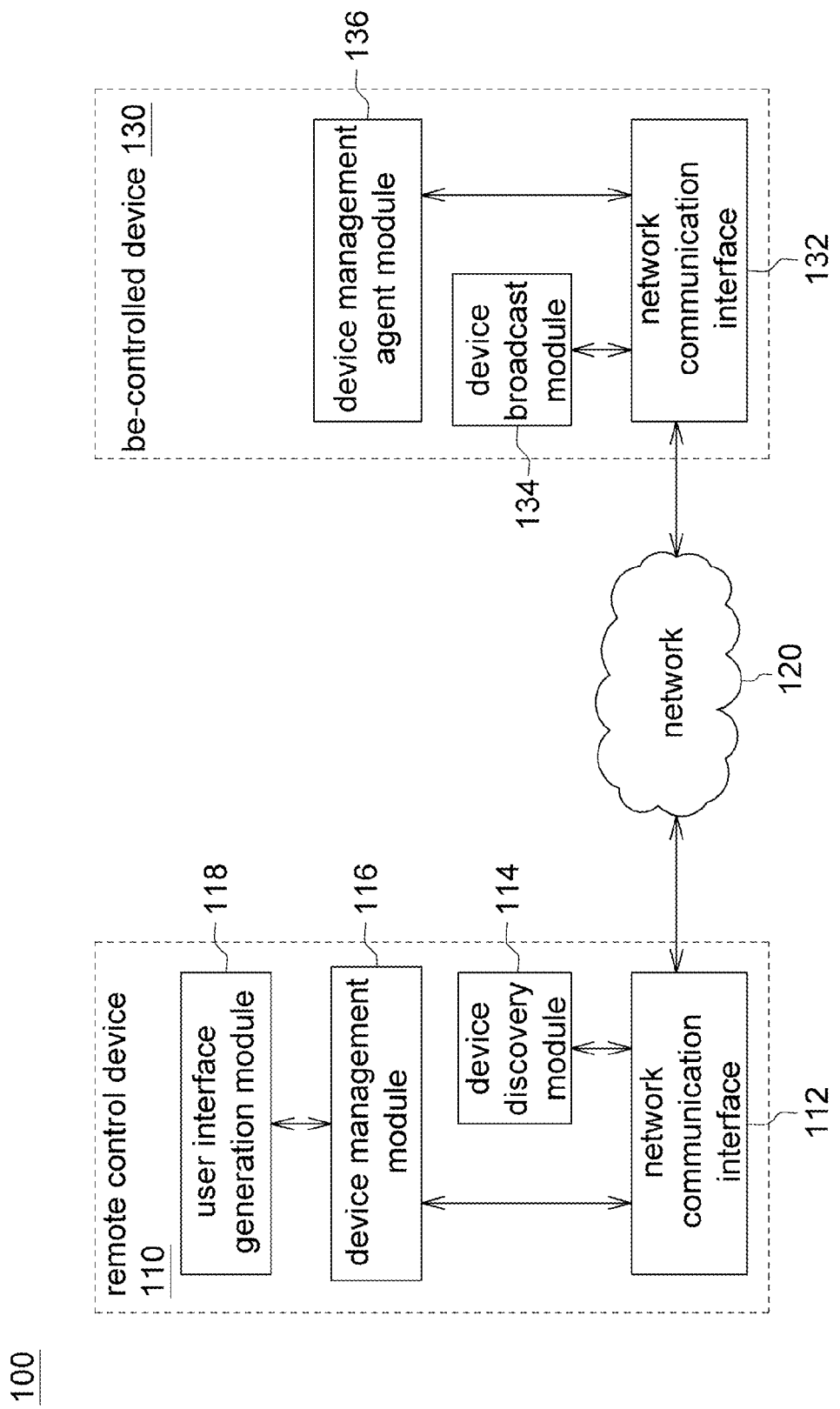
FIG. 1 shows a schematic illustration illustrating a remote control system according to an embodiment.

Referring to FIG. 1, a schematic illustration illustrating a remote control system according to an embodiment is shown. The remote control system 100 includes a remote control device 100 and at least one be-controlled device 130. The remote control device communicates with the be-controlled device 130 via a network 120 such as an Ethernet, a Zigbee network, a Bluetooth network or a power line network without limitation.

The remote control device 110 includes a network communication interface 112, a device discovery module 114, a device management module 116 and a user interface generation module 118. The be-controlled device 130 includes a network communication interface 132, a device broadcast module 134 and a device management agent module 136. The network communication interface 112 of the remote control device 110 and the network communication interface 132 of the be-controlled device 130 are both used to communicate with the network 120.

In addition, it takes care that in FIG. 1, although the remote control device 110 including the network communication interface 112, the device discovery module 114, the device management module 116 and the user interface generation module 118, and the be-controlled device 130 includes the network communication interface 132, the device broadcast module 134 and the device management agent module 136 are taken as being exemplified, it is not limited thereto in this application and any other types of combination condition can be used and are within the scope of this disclosure. The device discovery module 114 and the device management module 116 may be disposed in a physical sub remote control device, for example a home gateway, and the device management agent module 136 may be the same. The physical disposition and combination of the elements of the remote control device 110 and the be-controlled device 130 are decided according to the user's requirements, and it is not limited thereto.

Figure 2:
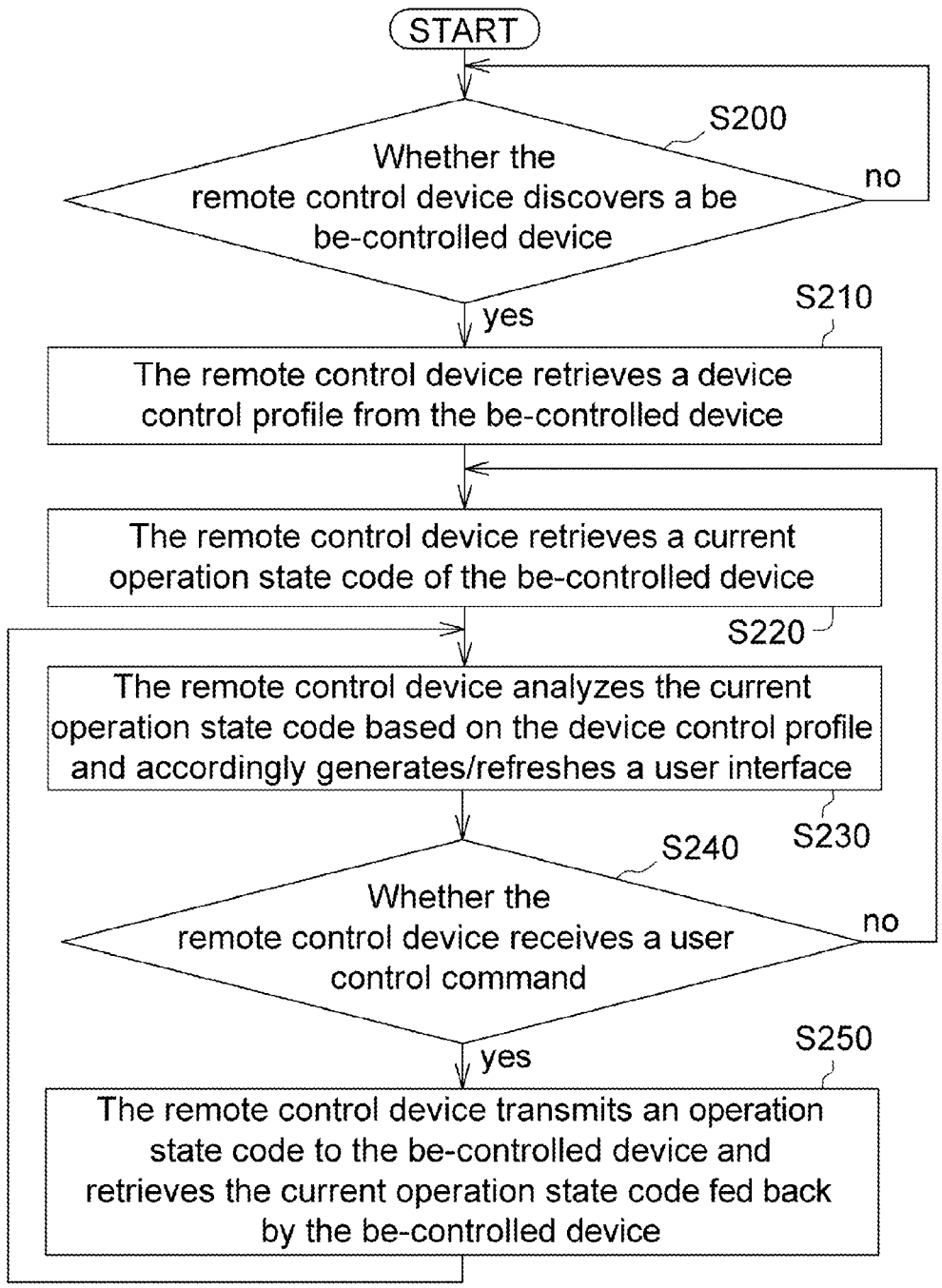
FIG. 2 shows a flow chart illustrating a remote control method according to an embodiment.

Then referring concurrently now to FIG. 2, a flow chart illustrating a remote control method according to an embodiment is shown. In step S200, the remote control device 100 determines whether the be-controlled device 130 is discovered. In this step, the device discovery module 114 of the remote control device 110 automatically discovers the be-controlled device 130 or other be-controlled devices connected to the external network 120 via the network communication interface 112 for communication; in addition, the device broadcast module 134 may also automatically broadcast device information to the network 120 to be discovered by the remote control device 110 for communication. The device information includes login information and the like.

After the remote control device 110 communicates with the be-controlled device 130, in step S210, the device management module 116 of the remote control device 110 retrieves a device control profile (DCP) from the device management agent module 136 of the be-controlled device 130 via the network 120. The device control profile includes a composite finite state machine representing the dependency of various states of the be-controlled device 130 and multiple control codes coded in a bit-string format.

Figures 3, 4:
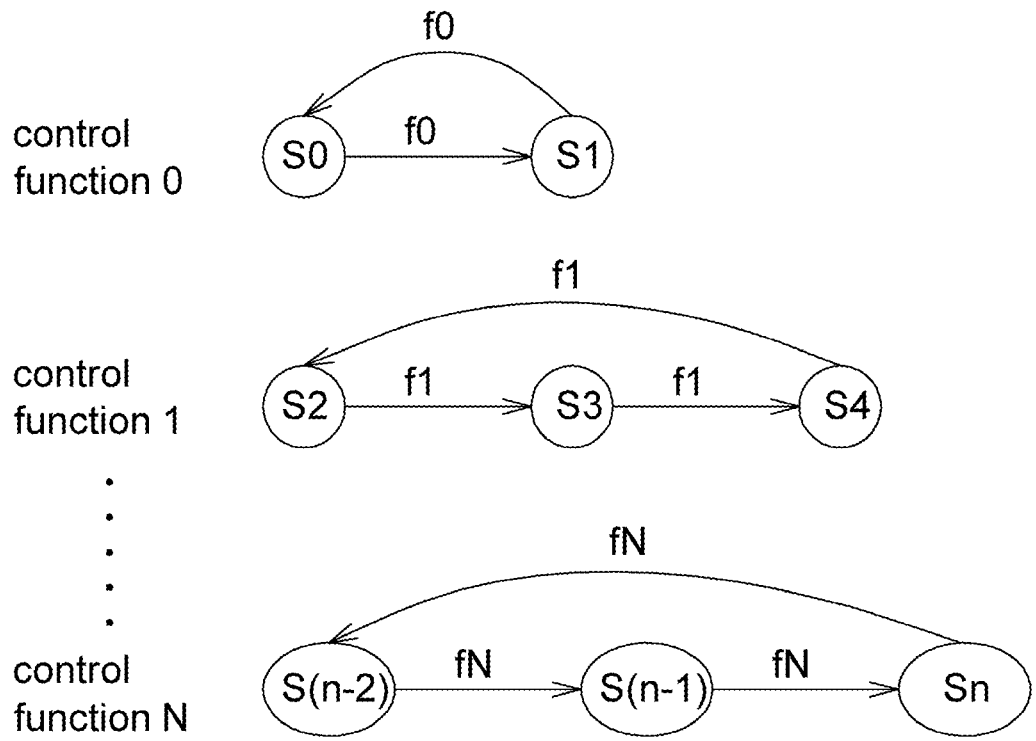
FIG. 3 shows a schematic illustration illustrating a composite finite state machine of the be-controlled device according to an embodiment.
FIG. 4 shows a schematic illustration illustrating a device control profile of the be-controlled device in a bit-string format according to an embodiment.

In the embodiment, the device control profile represents coexistence characteristic of many single operation state machines of the be-controlled device 130 in a form of a composite finite state machine. Referring to FIG. 3, a schematic illustration illustrating a composite finite state machine of the be-controlled device according to an embodiment is shown. Corresponding various control functions provided by the be-controlled device 130, the composite finite state machine is a set of multiple single finite state machines, each single finite state machine representing a single control function of the be-controlled device 130. Besides, the device control profile defines multiple function identification codes, multiple function names, multiple state identification codes and multiple state names of the composite finite state machine corresponding to the be-controlled device 130, coded in a bit-string format as shown in FIG. 4.

After the remote control device 110 retrieves the device control profile from the be-controlled device 130, in step S220, the device management module 116 retrieves a current operation state code from the device management agent module 136 of the be-controlled device 130 via the network 120 periodically. Then, in step S230, the user interface generation module 118 of the remote control device 110 analyzes the current operation state code based on the device control profile of the be-controlled device 130 to accordingly generate a user interface dynamically for users to select commands to control and operate the be-controlled device 130.

In step S240, the remote control device 110 determines whether the users input a user control command in a constant period or an interface event. If the users do not input any user control command, it proceeds back to step S220. If the user control command is received, the remote control device 110 transmits an operation state code to the be-controlled device 130 in step S250. The be-controlled device 130 switches operation states to perform corresponding control functions according to the composite finite state machine of the device control profile that the operation code corresponds to. The device management agent module 136 of the be-controlled device 130 feeds back the current operation state code corresponding to the changed state after the corresponding control function is performed successfully. Thereafter, it proceeds back to step S230, the device management module 116 of the remote control device 110 passes current state code to the user interface generation module 118 to accordingly refresh the user interface.

Take the be-controlled device 130 be an UPnP fan for example but is not limited thereto, and any other types of devices with characteristics of a control function cycle and finite operation states are within the scope of this disclosure. Assume that a user interface of the UPnP fan has 3 control buttons such as a power button, a situation mode button and a wind-speed button. The power button turns the UPnP fan on or off; the situation mode button controls the UPnP fan to switch between a normal mode, a sleep mode or a natural mode; the wind-speed button controls wind-speed of the UPnP fan to be high, middle or low. Consequently, input states and outputs of the UPnP fan are shown as Table 1.

TABLE 1

| Current Operation State | Control Button | Next Operation State |
|---|---|---|
| Power off | Power button | Power on, Normal mode, Middle wind-speed |
| Power on, Normal mode, Middle wind-speed | Power button | Power off |
| | Situation Mode button | Power on, Sleep mode |
| | Wind-speed button | Power on, Normal mode, High wind-speed |
| Power on, Sleep mode | Power button | Power off |
| | Situation Mode button | Power on, Natural mode |
| Power on, Natural mode | Power button | Power off |
| | Situation Mode button | Power on, Normal mode |
| Power on, Normal mode, High wind-speed | Power button | Power off |
| | Situation Mode button | Power on, Sleep mode |
| | Wind-speed button | Power on, Normal mode, Low wind-speed |
| Power on, Normal mode, Low wind-speed | Power button | Power off |
| | Situation Mode button | Power on, Sleep mode |
| | Wind-speed button | Power on, Normal mode, Middle wind-speed |

Figures 5, 6:
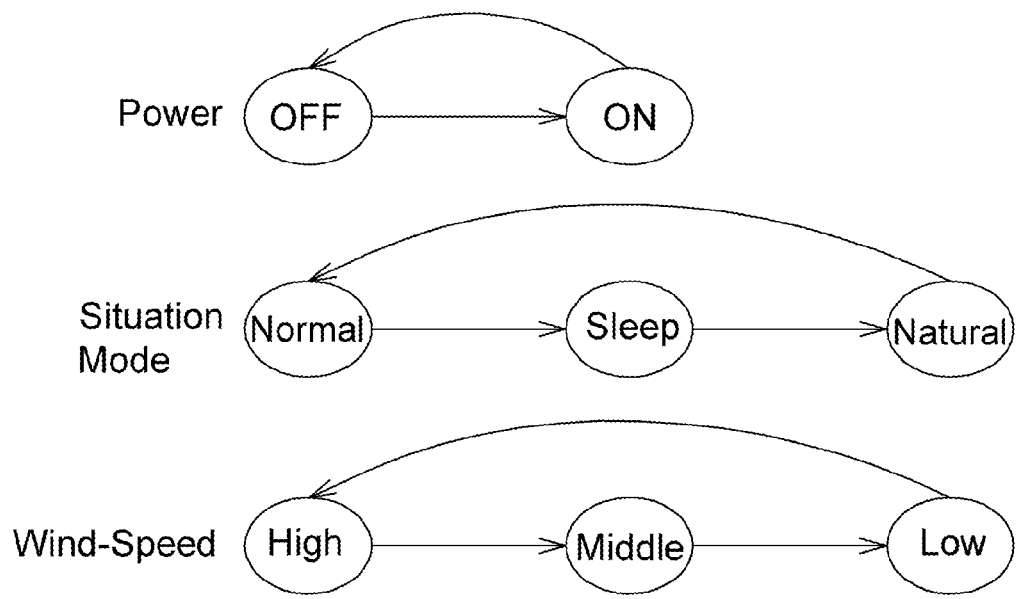
FIG. 5 shows a schematic illustration illustrating a composite finite state machine of the UPnP fan according to an embodiment.
FIG. 6 shows a schematic illustration illustrating a device control profile and control codes in a bit-string format of the UPnP fan according to an embodiment.
Figure 7:
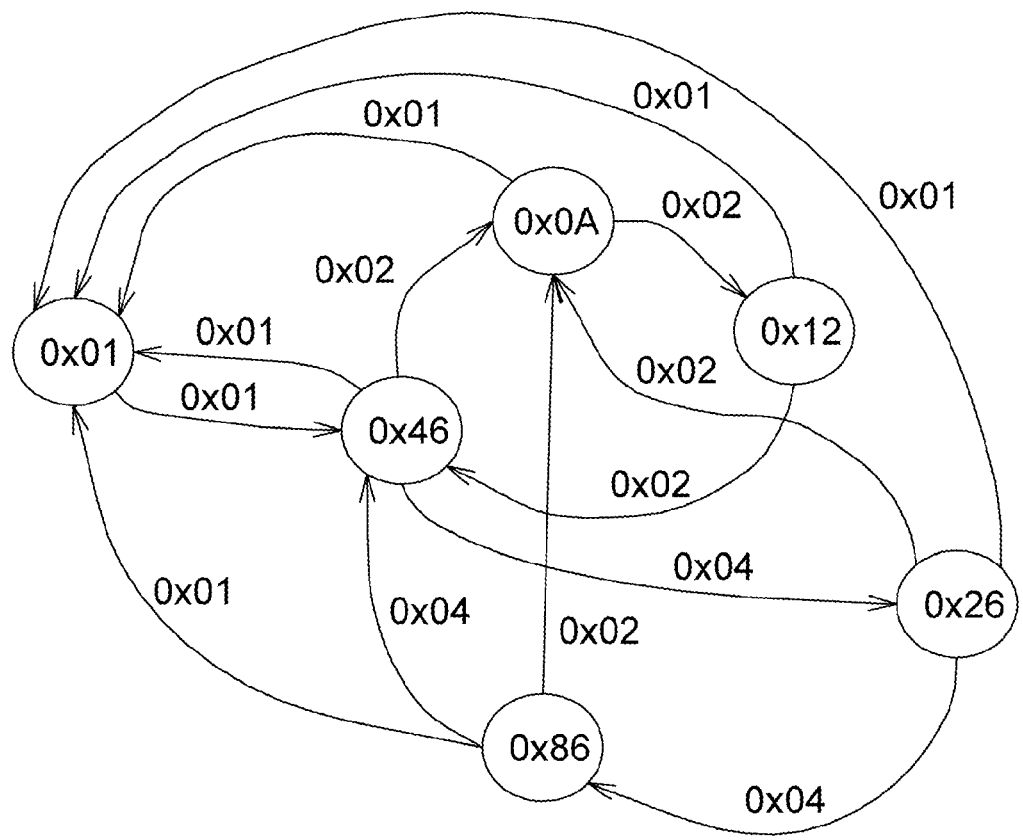
FIG. 7 shows an operation state diagram of the UPnP fan according to an embodiment.

It can be observed from Table 1 that the dependency of the UPnP fan corresponds two aspects. One is that the situation mode button and the wind-speed button do not work as the power is off; the other is that the wind-speed button does not work as the UPnP fan is in the sleep mode or the natural mode. Referring to FIGS. 5 to 7, FIG. 5 shows a schematic illustration illustrating a composite finite state machine of the UPnP fan according to an embodiment, FIG. 6 shows a schematic illustration illustrating a device control profile and control codes in a bit-string format of the UPnP fan according to an embodiment, and FIG. 7 shows an operation state diagram of the UPnP fan according to an embodiment. The operation state diagram of the UPnP fan in FIG. 7 can be simplified into an operation state transition table of the UPnP fan such as Table 2.

TABLE 2

| Current operation state code | Control button | Next operation state code |
|---|---|---|
| 0x01 | 0x01 | 0x46 |
| 0x46 | 0x01 | 0x01 |
| | 0x02 | 0x0A |
| | 0x04 | 0x26 |
| 0x0A | 0x01 | 0x01 |
| | 0x02 | 0x12 |
| 0x12 | 0x01 | 0x01 |
| | 0x02 | 0x46 |
| 0x26 | 0x01 | 0x01 |
| | 0x02 | 0x0A |
| | 0x04 | 0x86 |
| 0x86 | 0x01 | 0x01 |
| | 0x02 | 0x0A |
| | 0x04 | 0x46 |

Figure 8A:
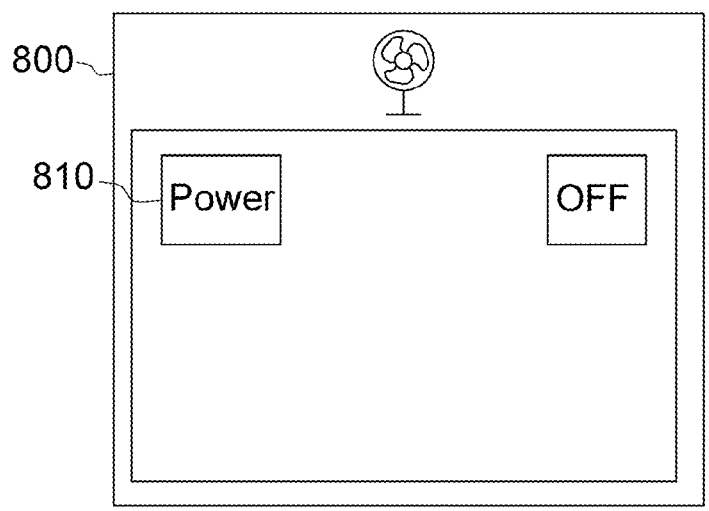
FIGS. 8A to 8E show schematic illustrations illustrating the user interface of the UPnP fan according to embodiments.
Figure 8B:
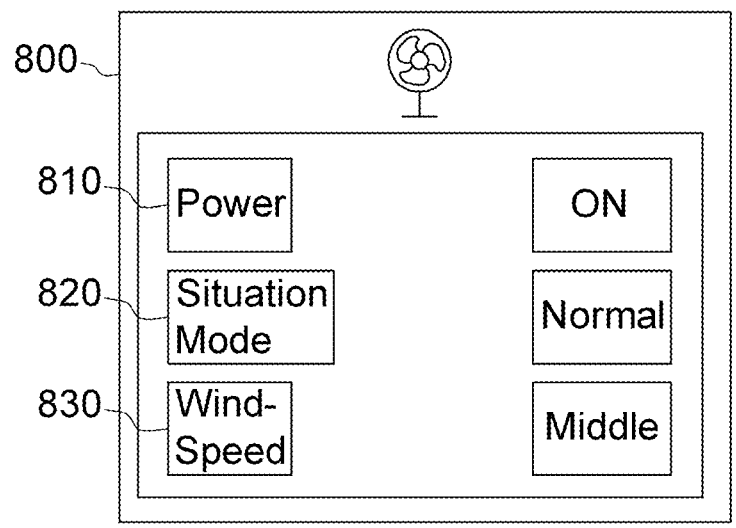
Figure 8C:
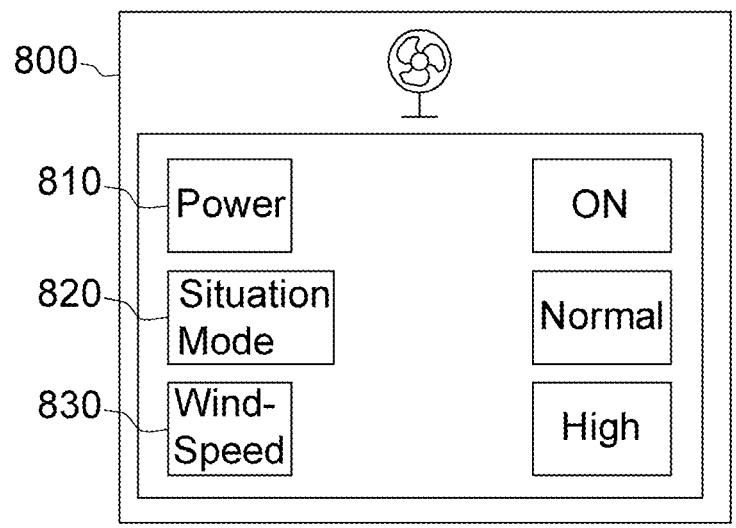

Then take the user interface as an example. Referring to FIGS. 8A to 8E, schematic illustrations illustrating the user interface of the UPnP fan according to embodiments are shown. In FIG. 8A, a user interface 800 only displays a power button 810 and the operation state "off" as the UPnP fan is in the power-off operation state. Therefore, there are always active function buttons that can be chosen by the user to avoid exception and provide simple and intuitive user interfaces. In FIG. 8B, the user interface 800 displays the power button 810, a mode button 820 and a wind-speed button 830 and the corresponding operation states "off", "normal" and "middle" as the UPnP fan is in the power-off, normal-mode and middle-wind-speed operation state. If the wind-speed button 830 is pressed, the user interface 800 is refreshed as shown in FIG. 8C. The user interface 800 displays the power button 810, the mode button 820 and the wind-speed button 830 and the corresponding operation states "on", "normal" and "high".

Figure 8D:
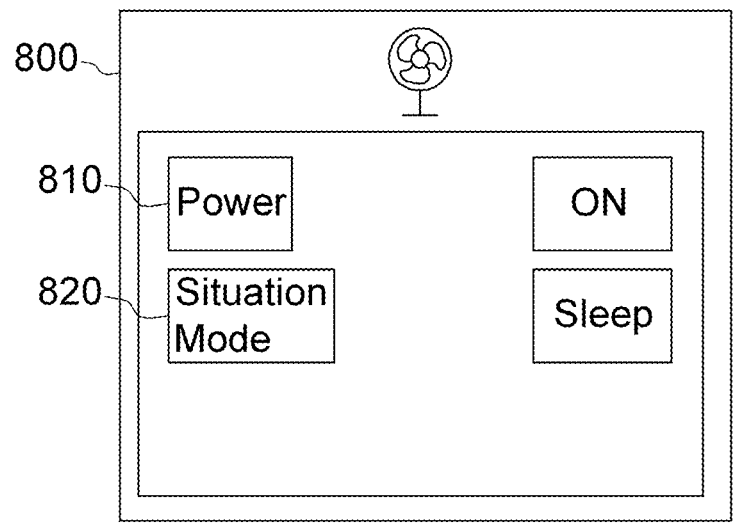
Figure 8E:
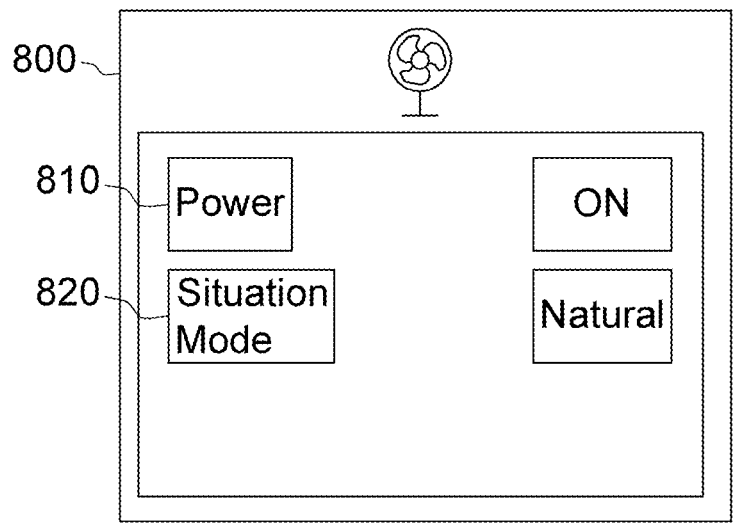

In FIG. 8D, the user interface 800 displays the power button 810 and the mode button 820 and the respectively corresponding operation states "on" and "sleep" as the UPnP fan is in the power-on and sleep-mode operation state. Because the wind-speed of the UPnP fan cannot be operated in the sleep mode, the user interface 800 in FIG. 8D does not display the wind-speed button and the corresponding operation state. If the mode button 820 is pressed, the user interface 800 is refreshed as shown in FIG. 8E. The user interface 800 displays the power button 810 and the mode button 820 and the corresponding operation states "on" and "natural". Because the wind-speed of the UPnP fan cannot be operated in the natural mode, the user interface 800 in FIG. 8E neither displays the wind-speed button and the corresponding operation state.

In conclusion, the data transmission bandwidth between the remote control device and the be-controlled device can be reduced due to using the composite finite state machine as the device control profile and the device control codes coded in the bit-string format.

The disclosure provides a method, a system, a remote control device and a be-controlled device, capable of designing the device control profile of the be-controlled device by a concept of the finite state machine, and representing the dependency of various operation states of the be-controlled device by the composite finite state machine based on cyclical operation modes and characteristics of finite operation states. Therefore, the remote control device may analyze the device control profile of the be-controlled device with the current sate code to dynamically generate the user interface for controlling the be-controlled device, such that only active functions and buttons are displayed on the user interface, hence the complexity of the user interface is simplified and function error or exception can be avoided.

On the other hand, the method, the system, the remote control device and the be-controlled device of this disclosure make use of the composite finite state machine to design the device control profile, and encode the function identifications and the state identifications in the bit-string format as the control transmission codes, hence the size of the control transmission size can be reduced to bytes. Therefore, the network transmission capacity is reduced and what the disclosure disclosed is more suitable for applying to a limited or small bandwidth network.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A remote control method applied to a remote control system, the remote control system comprising a remote control device and at least one be-controlled device, the remote control method comprising:
   discovering the at least one be-controlled device dynamically via a network and retrieving a device control profile from the at least one be-controlled device by the remote control device, the device control profile comprising a composite finite state machine representing the dependency of various operation states of the at least one be-controlled device and a plurality of control codes coded in a bit-string format;
   retrieving a current operation state code of the at least one be-controlled device via the network periodically by the remote control device; and
   analyzing the current operation state code based on the device control profile by the remote control device to accordingly generate a user interface displaying only active functions and buttons to control the at least one be-controlled device;
   wherein the device control profile defines a plurality of function identification codes, a plurality of function names, a plurality of state identification codes and a plurality of state names of the composite finite state machine corresponding to the at least one be-controlled device.

2. The remote control method according to claim 1, wherein the remote control device automatically discovers the at least one be-controlled device via the network for communication, or the at least one be-controlled device automatically broadcasts device information to the network to be discovered by the remote control device for communication.

3. The remote control method according to claim 1, further comprising:
   determining whether a user control command is received by the remote control device;
   transmitting an operation state code to the at least one be-controlled device by the remote control device if the user control command is received, and retrieving the current operation state code fed back by the at least one be-controlled device; and
   analyzing the current operation state code based on the device control profile by the remote control device, and accordingly refreshing the user interface.

4. The remote control method according to claim 1, wherein the network includes an Ethernet, a Zigbee network, a Bluetooth network or a power line network.

5. The remote control method according to claim 1, wherein the composite finite state machine is a set of a plurality of single finite state machines, each single finite state machine representing a single control function of the at least one be-controlled device.

6. A remote control system, comprising:
   at least one be-controlled device; and
   a remote control device for discovering the at least one be-controlled device dynamically via a network and retrieving a device control profile from the at least one be-controlled device, the device control profile comprising a composite finite state machine representing the dependency of various operation states of the at least one be-controlled device and a plurality of control codes coded in a bit-string format, the remote control device further retrieving a current operation state code from the at least one be-controlled device via the network periodically;
   wherein the remote control device analyzes the current operation state code based on the device control profile and accordingly generates a user interface displaying only active functions and buttons for choosing the corresponding control code which will be transmitted to the at least one be-controlled device to change the operation state;
   wherein the device control profile defines a plurality of function identification codes, a plurality of function names, a plurality of state identification codes and a plurality of state names of the composite finite state machine corresponding to the at least one be-controlled device.

7. The remote control system according to claim 6, wherein the remote control device automatically discovers the at least one be-controlled device via the network for communication, or the at least one be-controlled device automatically broadcasts device information to the network to be discovered by the remote control device for communication.

8. The remote control system according to claim 6, wherein the remote control device determines whether a user control command is received, the remote control device transmits an operation state code to the at least one be-controlled device if the user control command is received and retrieves the current operation state code fed back from the at least one be-controlled device, and the remote control device analyzes the current operation state code based on the device control profile to accordingly refresh the user interface.

9. The remote control system according to claim 6, wherein the network includes an Ethernet, a Zigbee network, a Bluetooth network or a power line network.

10. The remote control system according to claim 6, wherein the composite finite state machine is a set of a plurality of single finite state machines, each single finite state machine representing a single control function of the at least one be-controlled device.

11. A remote control device, comprising:
    a network communication interface for communicating with a network;
    a device discovery module for discovering at least one be-controlled device via the network for communication;
    a device management module for retrieving a device control profile and a current operation state code from the at least one be-controlled device via the network, the device control profile comprising a composite finite state machine representing the dependency of various operation states of the at least one be-controlled device and a plurality of control codes coded in a bit-string format, the device management module further for transmitting the control codes to the at least one be-controlled device to change its operation state; and a user interface generation module for analyzing the current operation state code based on the device control profile, and accordingly generating or refreshing a user interface displaying only active functions and buttons dynamically to control the at least one be-controlled;

wherein the device control profile defines a plurality of function identification codes, a plurality of function names, a plurality of state identification codes and a plurality of state names of the composite finite state machine corresponding to the at least one be-controlled device.

12. The remote control device according to claim 11, wherein the device management module determines whether a user control command is received, the device management module transmits an operation state code to the at least one be-controlled device if the user control command is received and retrieves the current operation state code fed back from the at least one be-controlled device, and then the remote control device analyzes the current operation state code based on the device control profile to accordingly refresh the user interface.

13. The remote control device according to claim 11, wherein the network includes an Ethernet, a Zigbee network, a Bluetooth network or a power line network.

14. The remote control device according to claim 11, wherein the composite finite state machine is a set of a plurality of single finite state machines, each single finite state machine representing a single control function of the at least one be-controlled device.

15. A be-controlled device, comprising:
a network communication interface for communicate with a network;
a device broadcast module for automatically broadcasting device information to the network to be discovered by a remote control device for communication; and
a device management agent module for providing a device control profile and a current operation state code when the remote control device requested via the network, the device control profile comprising a composite finite state machine representing the dependency of various operation states of the be-controlled device and a plurality of control codes coded in a bit-string format, for analyzing the current operation state code based on the device control profile, and accordingly generating or refreshing a user interface displaying only active functions and buttons dynamically to control the at least one be-controlled device;
wherein the device control profile defines a plurality of function identification codes, a plurality of function names, a plurality of state identification codes and a plurality of state names of the composite finite state machine corresponding to the be-controlled device.

16. The be-controlled device according to claim 15, wherein the device management agent module receives an operation state code from the remote control device, changes the operation state and feeds back the current operation state code to the remote control device.

17. The be-controlled device according to claim 15, wherein the composite finite state machine is a set of a plurality of single finite state machines, each single finite state machine representing a single control function of the be-controlled device.

18. The be-controlled device according to claim 15, wherein the network includes an Ethernet, a Zigbee network, a Bluetooth network or a power line network.

* * * * *